United States Patent [19]

Desjardins

[11] 4,349,317
[45] Sep. 14, 1982

[54] BEARINGLESS ROTOR FOR SINGLE AND TANDEM HELICOPTERS

[75] Inventor: Rene A. Desjardins, Media, Pa.

[73] Assignee: The Boeing Company, Seattle, Wash.

[21] Appl. No.: 90,717

[22] Filed: Nov. 2, 1979

[51] Int. Cl.³ .............................................. B64C 27/40
[52] U.S. Cl. ................................. 416/134 A; 416/141
[58] Field of Search .......... 416/134 A, 138 A, 140 A, 416/141, 107

[56] References Cited

U.S. PATENT DOCUMENTS

| | | | |
|---|---|---|---|
| 3,669,566 | 6/1972 | Bourquardez et al. | 416/134 A |
| 3,762,834 | 10/1973 | Bourquardez et al. | 416/134 A |
| 3,765,267 | 10/1973 | Bourquardez et al. | 74/581 |
| 3,874,815 | 4/1975 | Baskin | 416/134 A |
| 3,880,551 | 4/1975 | Kisovec | 416/138 A |
| 3,999,887 | 12/1976 | McGuire | 416/141 |
| 4,008,980 | 2/1977 | Noehren et al. | 416/138 A X |
| 4,047,839 | 9/1977 | Ferris et al. | 416/134 A |
| 4,104,003 | 8/1978 | Mouille | 416/141 |
| 4,111,605 | 9/1978 | Roman et al. | 416/138 A X |
| 4,293,277 | 10/1981 | Aubry | 416/141 X |

FOREIGN PATENT DOCUMENTS

| | | |
|---|---|---|
| 2756071 | 7/1978 | Fed. Rep. of Germany ... 416/134 A |
| 2921421 | 12/1979 | Fed. Rep. of Germany ... 416/138 A |

*Primary Examiner*—Everette A. Powell, Jr.
*Attorney, Agent, or Firm*—Felix J. D'Ambrosio; Jack D. Puffer; Edwin E. Greigg

[57] ABSTRACT

A bearingless rotor system has a flexible strap member to which the root of a rotor blade is attached, and a pitch rod aligned with the pitch axis and mounted to the rotor blade root and to a pitch arm, which arm transmits control system variations by way of a pitch link to the pitch rod. Tapered shoes are disposed adjacent the surfaces of the strap and are capable of applying a restoring force to the strap in opposition to flexural displacements of the strap member.

9 Claims, 6 Drawing Figures

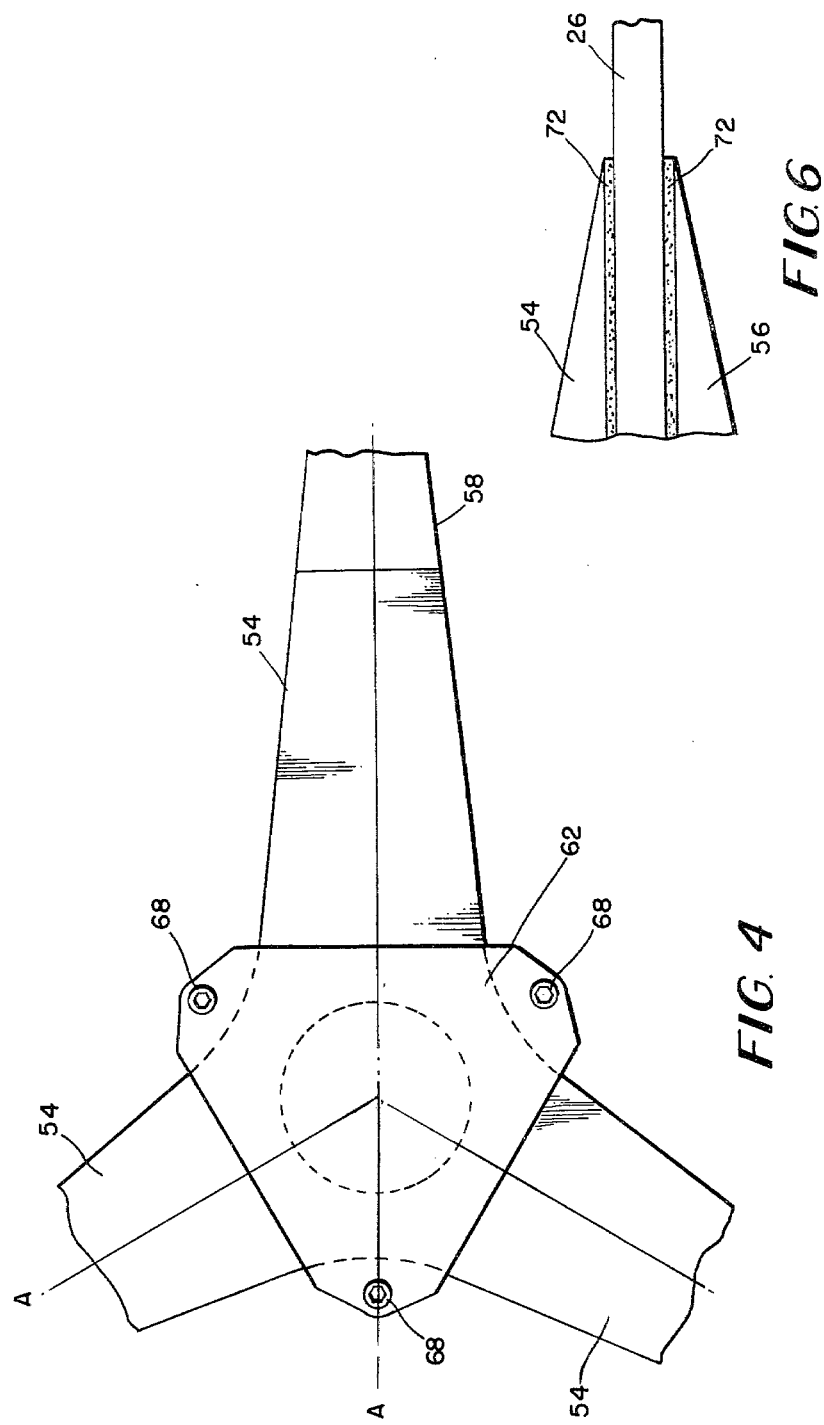

BEARINGLESS ROTOR FOR SINGLE AND TANDEM HELICOPTERS

BACKGROUND OF THE INVENTION (a) Field of the Invention

This invention relates to bearingless rotor hubs to which the rotor blades of a helicopter are attached and more particularly to rotor hubs providing an element having bending and torsional flexibility about certain axes for connecting the blades to the hub.

(b) Description of the Prior Art

A helicopter rotor blade is formed such that its cross-section defines an outer contour that is airfoil-shaped. Due to the rotation of the blade, the forward flight of the helicopter and the angle of attack existing between the ambient airstream and the mean chord of the airfoil, an aerodynamic lift force is developed along the blade length. This lift varies along the length as a higher order function of the velocity of the airstream relative to the blade, and likewise varies around the rotor azimuth in response to relative velocity variations. In addition to local relative velocity variations, other parameters affecting lift are also changing. For example, a rotor blade is generally formed so that its airfoil thickness contour varies uniformly along its length; the lift is proportional to airfoil thickness provided other parameters are held constant. The control system alters the local angle of attack around the rotor azimuth in a manner that produces the minimum angle at the rotor position where local airstream velocity is maximum and conversely a maximum angle of attack where airstream velocity is minimum.

These and other design parameters are adopted in recognition that lift on the rotor has an inherently changing value both along the blade length and around the rotor. The intent is to produce a more nearly uniform lift on the rotor blade regardless of its position or the speed of the aircraft. This desired result has, of course, not been attained due to the unpredictable variations in the conditions under which the aircraft must operate. Furthermore, since drag on an airfoil is proportional to lift and directed perpendicular to the lift vector, in-plane load variations similar to the normal-plane effects of lift forces are produced as well.

Since the normal and in-plane forces are distributed along the length of the blade, bending moments, in addition to the various blade, planar and normal-plane forces, one of which is lift, are produced at a given rotor blade radius station due to the forces outboard of the particular radius station. These bending moments, which increase in magnitude at the inboard regions of the blade radius, as do the planar and normal plane forces, would be transmitted to the aircraft by way of the attachment of the rotor blade to the rotor hub and thence to the vertical shaft, transmission control system and eventually to the aircraft cabin structure and fuselage. It has long been recognized that this is an undesirable result since it introduces excessive vibration to the aircraft and, because of the great magnitude of the bending moments so produced, tends to control the attitude of the aircraft by external flight conditions rather than by the operations of the pilot on the control system.

Therefore, in order to reduce the magnitude of the moments actually transmitted to the aircraft by these bending moments, a rotor was developed that incorporated at least two hinges at the inboard region of the rotor blade, the axis of one hinge being generally normal to the rotor plane and the other generally in the rotor plane. The effect of this development was to reduce the bending moments to zero at the hinge since a hinge can transmit no moment about its axis, but the direct in-plane and normal-plane forces are capable of being transmitted past the hinge joint. In this way, the moments actually transmitted to the aircraft are, in magnitude, the product of the direct forces at each hinge and the radial offset of the respective hinges from the vertical shaft-rotor hub attachment joint. This lesser moment is known as the control moment and is instrumental in maintaining attitudinal control and disposition of the aircraft. The radial position of the hinges can be chosen by design to produce the optimal amount of control moment for the requirements of the aircraft. Typically, the inner most hinge is located between two and four percent of the rotor radius for tandem helicopters and between five and eight percent of the rotor radius for single rotor helicopters.

More recent developments in rotor hub and blade design have allowed the elimination of the rotor hinges and the production of so-called bearingless rotors. This advance has been largely made possible by the introduction of the fiber-reinforced resin-matrix materials, which allow the stiffness properties of the rotor blade root adjacent its attachment to the rotor hub to be adjusted to suit certain optimal and desired values. Rotors having these properties are characterized by being relatively flexible in the in-plane and normal-plane bending sense and relatively stiff about the other axes and senses of structural displacement. However, design advancement, even with this newer concept, has been curtailed by a tendancy of bearingless rotors to exhibit a effective or virtual hinge radial offset in excess of ten percent of the rotor radius. The hinge offset is virtual, only, because, since no actual hinge or bearing is employed, the flexible bending nature of the blade root produces a sharp gradient of bending rotation in the vicinity of the blade root. This gradient is so pronounced as to give the appearance and the operational effect of the conventional normal-plane and in-plane hinge bearings. The resulting ten percent hinge offset is realizable, furthermore, only by employing complicated shear bearings and other devices that tend to reduce the magnitude of the offset conventional rotor design has heretofore demonstrated to be optimal.

A second device, known as a "fixed shoe" provides a preferred inner contour to which the deflected rotor blade must conform, which contour produces the desired radial offset. The fixed shoe as well as shear bearings result in the addition of considerable complexity and high wear between the chafing surfaces of the bearing and between the outer surface of the blade root and the shoe contour. It was the original intent of eliminating hinge bearings to eliminate their associated design complexity and the concomitant fatigue difficulties that rubbing, fretting and chafing surfaces are well known to cause.

OBJECTS AND SUMMARY OF THE INVENTION

The bearingless rotor disclosed herein comprises a rotor blade that terminates at its inboard root in a bolted attachment, which joins the blade to a radially extending strap member. The strap is generally formed of fiber-reinforced composite resin-matrix materials and has its structural stiffness and strength properties arranged to satisfy particular functional requirements. The strap is preferably of unitary construction and extends from the rotor center radially outwardly to provide the structural member to which the diametrically opposite blades attach in the case of a rotor having two diametrically opposite rotor blades. A strap may have an odd number of rotor blades attached in which case the strap may extend radially outwardly from the rotor center with an integral plurality of identical radial arms formed of unitary construction. A blade folding pin may be provided inboard of the blade attachment joint, in which case the strap will terminate at the folding joint and the blade will attach to a fitting that provides structural continuity between the folding and attachment joints.

Flexible shoes are arranged to abut the upper and lower surfaces of the strap member over a portion of the radial extent of the strap element. These shoes are not structurally joined to the strap (although they may be joined thereto by an elastomeric material), but flex in concert with the strap as it bends out-of-plane and provide a stiffening effect by increasing the bending stiffness of the composite strap-shoe system.

A pitch link transmits control system input from the swashplate to the blade by way of a radially extending pitch rod which varies the angle of attack of the blade by attaching to the blade root generally through the medium of the blade attachment fitting.

It would be advantageous in rotor systems of this type to have, and it is an object of this invention to provide a structural member capable of establishing a virtual hinge offset in the range of two to four percent of the rotor radius.

Another object is to accomplish this desirable range of effective hing offset by means of a simple member whose contour need not be rigidly maintained but is capable of adapting its flexural curvature to the bending curvature of the flexible strap.

Still another object is to provide means to produce an optimal range of virtual hinge offset in bearingless rotor systems without causing undue wear and added complexity to the system.

BRIEF DESCRIPTION OF THE DRAWINGS

FIG. 4 is a plan view of a three bladed rotor system according to this invention;

FIG. 6 is a detail view illustrating an alternate embodiment of the invention in which the shoes are separated by an elastomeric material.

DESCRIPTION OF THE PREFERRED EMBODIMENTS

Figure 1:
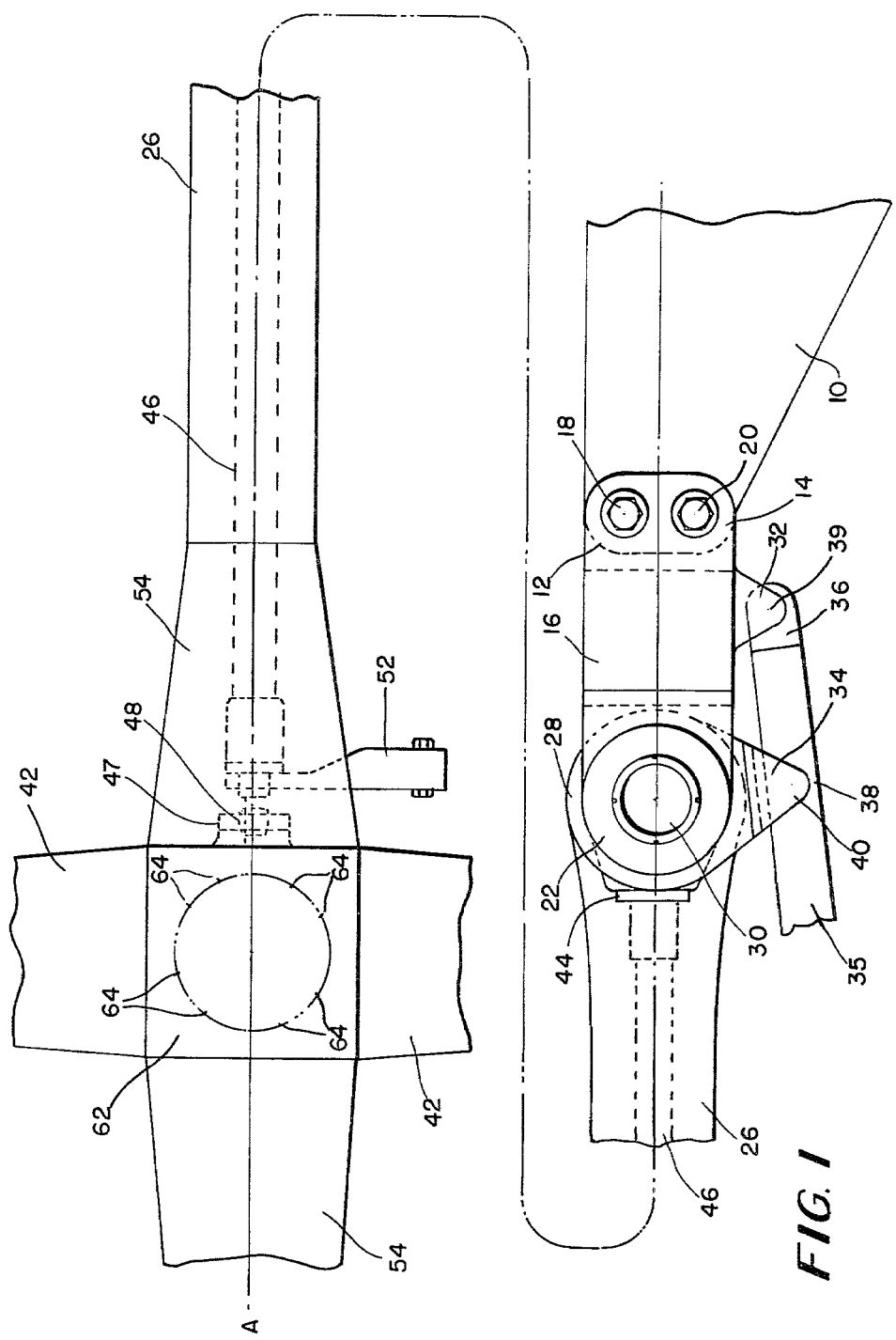
FIG. 1 is a plan view of a rotor system made according to this invention.

A rotor system constructed according to this invention includes a rotor blade 10 having formed at its inboard extremity an attachment joint in the shape of two lugs 12, 14 or other mechanical means for attachment to a blade-strap fitting 16. The fitting provides holes aligned with the holes of the blade root, defined by the lugs 12, 14, into which are inserted blade attachment bolts 18, 20. The fitting is a clevis type and extends inboard away from the blade root to define a second clevis formed by an upper lug 22 and a lower lug 24, which define cylindrical aligned holes therein. A preferably unitary strap member 26 formed generally of fiber reinforced resin-matrix composite material provides, at its outboard extremity, a lug 28 having a circular hole, which is aligned with the holes of lugs 22, 24 and into which is fitted a blade fold pin 30.

Fitting 16 is further provided with a pair of clevis joints 32, 34, which extend from its lagging side and generally perpendicular to the pitch axis A—A of the blade. A lead-lag, damper 35 (only partially shown) is positioned and attached to the clevis joints 32, 34 at mating lugs 36, 38, similarly joined by pins 39, 40 extending through the clevis 32, 34 and the lugs 36, 38.

Figure 2:
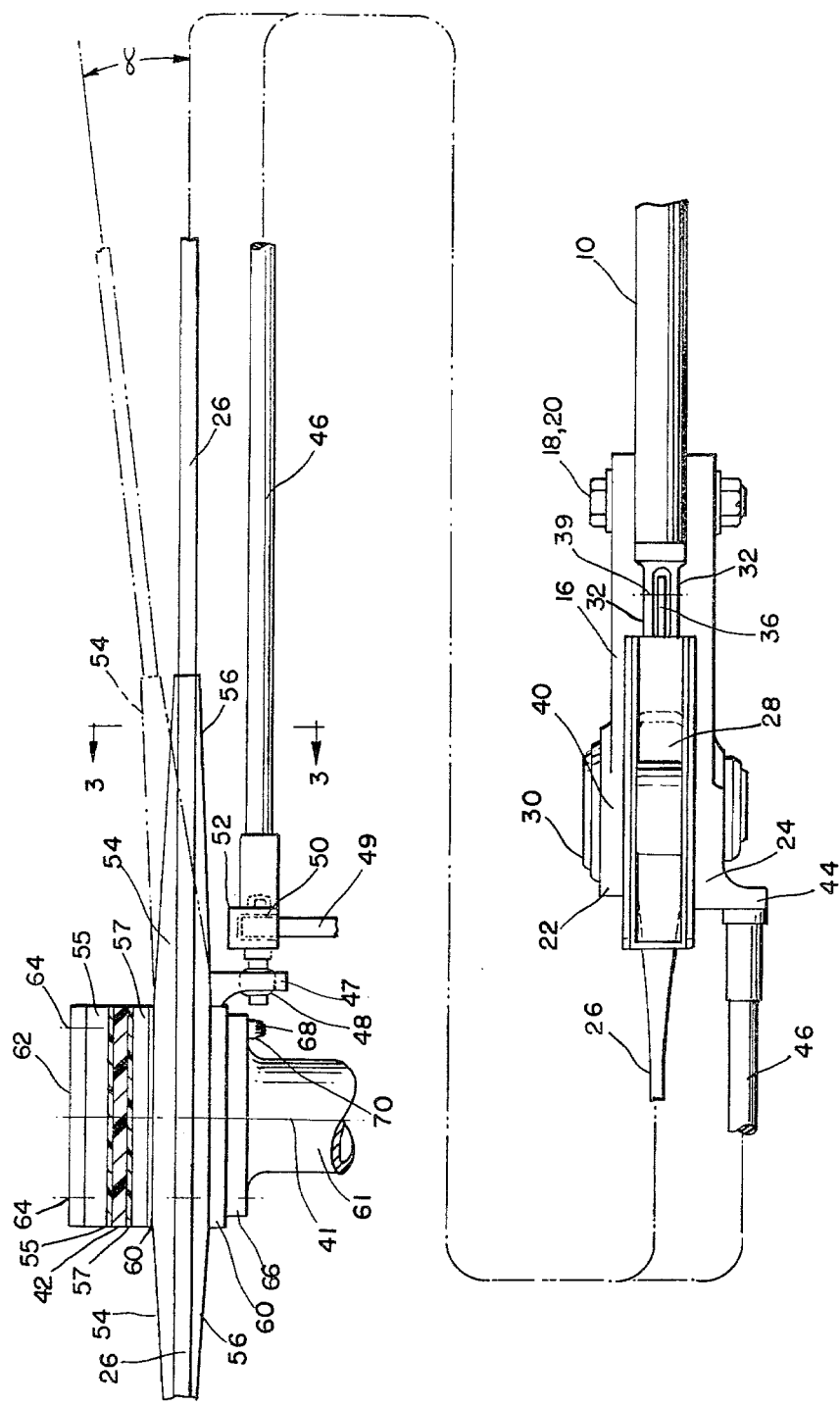
FIG. 2 is a side elevation view of the rotor system of FIG. 1.
Figure 3:
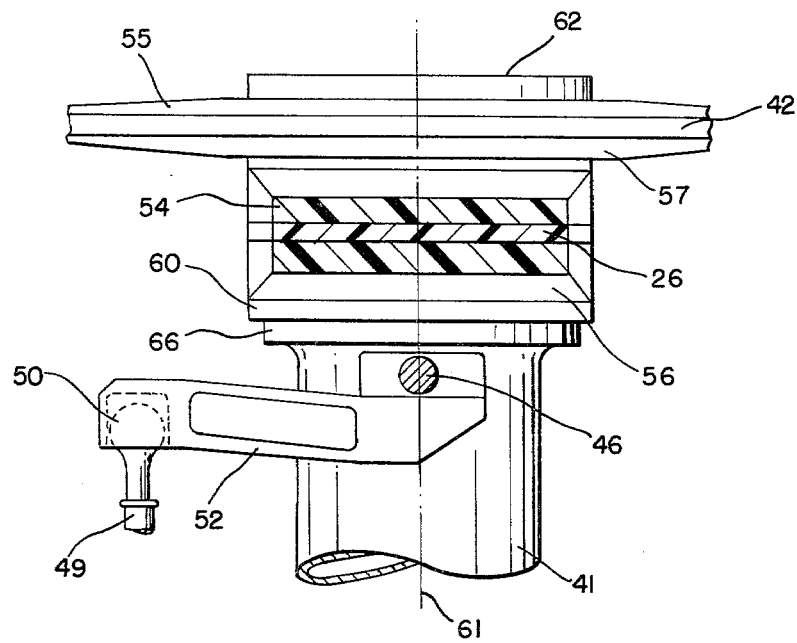
FIG. 3 is an end elevation sectional view taken at plane 3—3 of FIG. 2.

Inboard of the fold pin attachment, the strap member 26 has a uniform thickness, somewhat less than the thickness of lug 28, and a generally uniform width. The strap widens somewhat as it approaches the rotor center 41, about which point it is radially symetrical. In the embodiment of FIGS. 1-3, the unitary strap member 26 has two arms which extend radially outwardly from the rotor center.

A four-bladed rotor according to this invention has an identical strap 42 elevated with respect to strap 26 and directed radially but positioned perpendicular thereto. Similarly, the equipment described with respect to strap 26 is provided to the two rotor blades which attach to the outermost ends of the second strap 42.

Fitting 16 further provides a downwardly projecting flange 44 to which is rigidly attached at its outboard end a pitch rod 46. The rotor hub 60 is likewise provided with a flange 47 to which the inboard end of the pitch rod 46 is pinned by a universal joint 48 that allows rotation in all directions, but provides a shear and axial reaction to all forces carried by the rod 46. FIGS. 2 and 3 illustrate a pitch link 49, which is connected at one end to the control system (not illustrated) and is attached at its opposite end by a universal connection 50 to a pitch arm 52 at a position eccentric of the blade pitch axis A—A. The pitch arm 52 extends toward axis A—A and is rigidly attached to pitch rod 46 intermediate the pitch rod ends but adjacent the universal joint 48. In this way, the axial loads of the pitch link 49 are reacted nearly entirely at joint 48, a much smaller portion being carried to the flange 44 of fitting 16 by the pitch rod 46. Further, a twisting moment is produced in pitch rod 46 due to the eccentricity of the pitch link 49 from the axis of rod 46. Pitch arm 52 transfers the pitch link force and the associated moment to the rod 46.

In this way, the angle of attack of the rotor blade is caused to vary in direct response to pitch link loads. The straps 26, 42 are designed to be soft torsionally and because of this are not suitable for transferring the control-based torsion to the rotor blade.

The pitch rod 46, in addition to transmitting control torque to the blade for purpose of adjusting the angle of attack in response to control system input, provides a second function. When the rotors are still and not turning, they would tend to bend due to the weight of the blade since the very flexible strap would provide little resistance to this action were it not for the reaction provided by flange 47. Instead, the tendency of the strap 26 to bend is prevented since a radially outward force is produced at joint 48, which force is transmitted axially along the rod 46 to the fitting 16 at flange 44. Therefore, the static flap bending moment which produces this unwanted droop tendency, is reacted by tension in the strap 26, a load which lugs 12, 14 can readily accommodate, and compression in the pitch rod 26, which is easily designed for stability to resist this kind of load.

Two unitary flexurally resilient shoes are disposed, one 54 at the upper surface of strap 26 and a second 56 at its lower surface. Similarly, identical shoes 55 and 57 are provided adjacent the upper strap 42. These shoes are preferably made from fiberglass reinforced epoxy resin matrix composite material and, preferably, are simply located in contact with the respective surfaces of the strap. Like the strap 26, each unitary shoe has two arms which extend radially outward from the rotor center.

Each shoe 54-57 extends across the width of the strap and extends, as noted above, outwardly from the rotor center 41 approximately to eight percent of the rotor radius. The shoes 54-57 are tapered at their outer ends to avoid a sharp discontinuity in flapwise bending properties and are otherwise sized as to their thickness for the strength and load carrying capability of their material as is required to maintain structural compatibility with the straps 26, 42.

In operation, the shoes receive load from the straps 26, 42 as they bend normal to the axis A—A, that is, in flapwise bending. Rotor blades while operating define a conical surface around the rotor disc plane about which conical surface they flap, i.e., a cyclical flapwise motion is superimposed on the coning condition so that the blade displacement from the disc plane continually varies as the blade rotates.

The even number-bladed rotor of which FIGS. 1 and 2 are typical, further includes an upper rotor hub plate 62 positioned over an upper shoe 55, which has formed through its thickness, in substantial alignment with rotor shaft 61, and possibly in a circular pattern, a plurality of bolt holes 64. A similar and aligned pattern of bolt holes is formed through the upper flange 66 of the rotor shaft 61, the hub 60, the shoes 54-57 and the straps 26 and 42. Tension bolts 68 extend through the bolt holes of the pattern so that the bolt head (not shown) bears on the upper surface of plate 62 and the nut 70 bears on the under side of flange 66, of shaft 61.

The rotor system herein disclosed can, of course, be designed to incorporate an odd number of rotor blades. One possible approach, shown in FIG. 4, illustrates a unitary strap member 58 having three arms extending radially in the direction of the pitch axis of three respective rotor arms and is angularly displaced therefrom by 120 degrees. Similarly, the upper and lower shoes 54,56 (only shoe 54 is shown) are of unitary construction and extend parallel to the direction of the strap 58.

FIG. 2 illustrates a typical rotor blade coning condition, the flapwise displacement $\alpha$ of the strap 26 and the deflected position of the shoes 54, 56. It can be seen that the strap 26 on being displaced from its static condition bears on the inner surface of shoe 54, which action introduces load that is directed through the thickness of shoe 54 and serves to react normal-plane forces present in the strap 26. The forces so transmitted to shoe 54 cause its bending curvature to conform to the resultant curvature of the strap-shoe assembly operating together.

The effect of this cooperation is that the hinge offset remains constant for any amount of blade flapwise motion and the range of its radial extent can be maintained between the preferred limits of two to four percent of the rotor radius. Furthermore, by increasing the bending stiffness of the shoes 54-57 and their spanwise extent the virtual hinge offset can be readily varied along the blade radius to produce the preferred range of its spanwise position for single rotor helicopter applications, i.e., between five and eight percent of the rotor radius.

Figure 5:
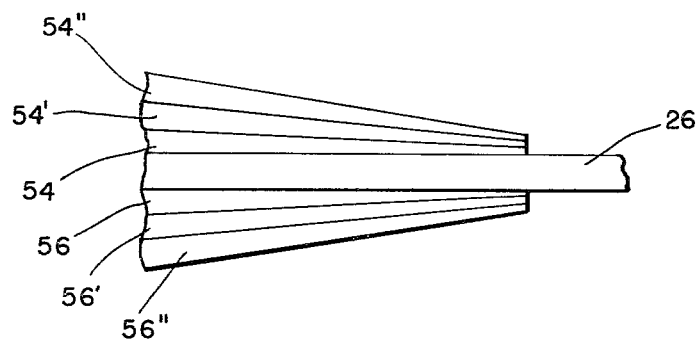
FIG. 5 is a detail view illustrating an alternate embodiment of the invention in which a plurality of upper and lower shoes are utilized.

Although only a single upper and lower shoe are envisioned, multiple upper and lower shoes 54', 54", etc. could be employed as shown in FIG. 5 if, for example, the desired curvature, load bearing capacity, proper hinge point location, or desired flapping angle dictate. That is, if the desired load bearing capacity were such as to require an excessively thick maximum depth of the shoes, then their effectiveness would be correspondingly reduced. In such a case, a configuration employing multiple shoes would be in order.

Also, if contamination is a problem, such as from the formation of loose dust particles in the joint, then an elastomeric material 72 can be utilized between the shoe and strap, or between respective shoes (FIG. 6). The elastomeric material will also serve to prevent excessive abrasive wear.

What is claimed and desired to be secured by Letters Patent of the United States is:

1. In a bearingless rotor system of a helicopter, including:
   a rotor hub defining a rotor center;
   at least one unitary strap member mounted on the rotor hub, each strap member having at least two arms which extend radially outwardly from the rotor center and define a continuous upper and lower surface and opposite outboard ends; and
   a rotor blade attached to each outboard end of each arm, the improvement comprising:
   at least one unitary contoured upper shoe member having a planar surface and an opposed contoured surface defining a constant thickness portion and radially opposed varying thickness portions extending from the constant thickness portion, said shoe member being mounted on the rotor hub and engageable with its planar surface with the upper surface of each arm of a respective strap member, and at least one unitary contoured lower shoe member having a planar surface and an opposed contoured surface defining a constant thickness portion and radially opposed varying thickness portions extending from the constant thickness portion, said shoe member being mounted on the rotor hub and engageable with its planar surface with the lower surface of each arm of a respective strap member, said shoe members serving to resist flapwise flexural displacement of the arms of their respective strap members and exert a force due to flapwise flexural displacement of the varying thickness portions of said shoe members with the arms of their respective strap members, tending to restore the arms of their respective strap members to their non-deflected position and to define a virtual hinge, the radial offset of which is within ten percent of the rotor radius.

2. The bearingless rotor system as defined in claim 1, further including:
   a blade-strap fitting for each arm and rotor blade combination, which connects the rotor blade to its respective arm.

3. The bearingless rotor system as defined in claim 2, wherein the improvement further comprises:
   a pitch rod extending parallel to each arm between the blade-strap fitting and the rotor hub, said pitch rod serving to control the angle of attack of the rotor blade and to react the tendency of the arm and attached rotor blade to bend when the rotor system is not operating.

4. The bearingless rotor system as defined in claim 3, wherein each blade-strap fitting includes a flange to which one end of the pitch rod is connected, and wherein the rotor hub includes connecting means to which the other end of the pitch rod is connected.

5. The bearingless rotor system as defined in claim 1, wherein the improvement further comprises:
   an elastomeric material situated between and adhered to the facing surfaces of each contoured shoe member and is corresponding arm.

6. The bearingless rotor system as defined in claim 1, wherein a plurality of unitary contoured upper shoe members and a plurality of unitary contoured lower shoe members are provided for each strap member, with the upper and lower surface of the arms of each strap member being in engagement with one contoured shoe member of each group of contoured shoe members, and with the remainder of the contoured shoe members of each group being in engagement with an adjacent contoured shoe member.

7. The bearingless rotor system as defined in claim 6, wherein the improvement further comprises:
   an elastomeric material situated between and adhered to the facing surfaces of adjacent contoured shoe members, and situated between and adhered to the upper and lower surfaces of the arms of each strap member and their corresponding shoe members.

8. The bearingless rotor system as defined in claim 1, wherein each shoe member extends outwardly from the rotor center approximately to eight percent of the rotor radius.

9. The bearingless rotor system as defined in claim 1, wherein the curvature of the varying thickness portions of said shoe members due to their flapwise flexural displacement conforms to the resultant curvature of the strap-shoe assembly operating together.

* * * * *